United States Patent
Wieder et al.

(10) Patent No.: US 9,505,386 B2
(45) Date of Patent: Nov. 29, 2016

(54) TRACTION-SLIP CONTROLLED BRAKE SYSTEM OF A MOTOR VEHICLE APPROACHING STOPS

(75) Inventors: Gerhard Wieder, Besigheim (DE); Péter Holobrádi, Budaörs (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 684 days.

(21) Appl. No.: 13/402,654

(22) Filed: Feb. 22, 2012

(65) Prior Publication Data

US 2012/0217794 A1    Aug. 30, 2012

(30) Foreign Application Priority Data

Feb. 24, 2011  (DE) .................. 10 2011 012 270

(51) Int. Cl.
 *B60T 13/68*   (2006.01)
 *B60T 8/48*   (2006.01)
(52) U.S. Cl.
 CPC .................... *B60T 8/4818* (2013.01)
(58) Field of Classification Search
 CPC .................................................. B60T 8/4818
 USPC ............... 303/3, 15, 122.01, 123, 139, 186, 303/119.1, 189, 113.2, 127
 See application file for complete search history.

(56) References Cited

U.S. PATENT DOCUMENTS

| 1,644,568 A | 10/1927 | Dapron |
| 3,795,423 A | 3/1974 | Shields et al. |
| 3,976,335 A | 8/1976 | Sekiguchi |
| 4,626,043 A * | 12/1986 | Belart et al. ............... 303/114.1 |
| 4,819,995 A | 4/1989 | Loehmann et al. |
| 4,824,181 A | 4/1989 | Tomala |
| 5,211,449 A | 5/1993 | Amtsfeld |

(Continued)

FOREIGN PATENT DOCUMENTS

| CN | 1093987 | 10/1994 |
| DE | 102 36 922 | 8/2002 |

(Continued)

OTHER PUBLICATIONS

English translation of International Search Report of corresponding International PCT Application No. PCT/EP2012/052898 date Jun. 22, 2012.

(Continued)

*Primary Examiner* — Christopher Schwartz

(57) ABSTRACT

A traction-slip controlled vehicle brake system having a) a service-brake valve, which generates an actuation-dependent pressure at an outlet port; b) a valve device, in a first operating position, establishes a connection from a pressure medium reserve and, in a second operating position, from a 2/2 solenoid valve to a brake actuator; c) the solenoid valve being connected to the outlet port of the service-brake valve and to a first connection of the valve device. The solenoid valve and valve device are controllable by a control device to d) allow the solenoid valve to switch open and the valve device to switch to the first operating position for traction-slip control; e) and a brake pressure generated at a predetermined level based on the pressure medium from the pressure medium supply in the brake actuator; the solenoid valve being switched closed and the valve device to the first operating position.

12 Claims, 7 Drawing Sheets

(56) References Cited

U.S. PATENT DOCUMENTS

| | | | |
|---|---|---|---|
| 5,342,119 A * | 8/1994 | Smith et al. | 303/113.2 |
| 5,632,306 A | 5/1997 | Taka | |
| 5,862,503 A | 1/1999 | Eckert et al. | |
| 5,882,090 A | 3/1999 | Ganzel | |
| 6,149,246 A | 11/2000 | Terborn et al. | |
| 6,183,050 B1 * | 2/2001 | Ganzel | 303/114.1 |
| 6,234,583 B1 | 5/2001 | Eckert | |
| 6,260,934 B1 | 7/2001 | Lee | |
| 7,020,551 B2 | 3/2006 | Goebels et al. | |
| 7,213,892 B2 * | 5/2007 | Kato et al. | 303/155 |
| 7,416,341 B2 | 8/2008 | Flores et al. | |
| 7,520,572 B2 | 4/2009 | Hatipoglu et al. | |
| 7,577,509 B2 | 8/2009 | Goebels et al. | |
| 8,078,378 B2 * | 12/2011 | Bradley, IV | 701/70 |
| 8,869,831 B2 * | 10/2014 | Haehn et al. | 137/596.16 |
| 2005/0179314 A1 | 8/2005 | Csak et al. | |
| 2006/0124428 A1 * | 6/2006 | Baxter, Jr. | 192/85 CA |
| 2006/0152075 A1 | 7/2006 | Goebels et al. | |
| 2009/0112432 A1 * | 4/2009 | Ueoka et al. | 701/70 |
| 2010/0168974 A1 | 7/2010 | Bradley, IV | |

FOREIGN PATENT DOCUMENTS

| | | |
|---|---|---|
| DE | 103 07 584 | 2/2003 |
| DE | 10 2009 016 982 | 11/2010 |
| DE | 10 2011 012 270 | 8/2012 |
| EP | 0604864 | 7/1994 |
| KR | 20020028311 | 4/2002 |

OTHER PUBLICATIONS

International Search Report of corresponding International PCT Application No. PCT/EP2012/052898 date Jun. 22, 2012.
German Office Action of priority application DE 102011012270.2 dated Jan. 31, 2012.
Bendix ATR-6 and ATR-3 Antilock Traction Relay Valves, Bendix Service Data Sheet No. SD-13-4861, BW2598, Apr. 2008.

* cited by examiner

TRACTION-SLIP CONTROLLED BRAKE SYSTEM OF A MOTOR VEHICLE APPROACHING STOPS

RELATED APPLICATION INFORMATION

The present application claims priority to and the benefit of German patent application no. 10 2011 012 270.2, which was filed in Germany on Feb. 24, 2011, the disclosure of which is incorporated herein by reference.

FIELD OF THE INVENTION

The present invention is directed to a traction-slip controlled brake system of a vehicle having a service-brake valve which generates an actuation-dependent pressure at at least one outlet port in response to an actuation, as well as having a valve device, which, in accordance with a first operating position, establishes a direct or indirect connection from a pressure medium reserve and, in accordance with a second operating position, from at least one 2/2 solenoid valve to at least one brake actuator; in accordance with the definition of the description set forth herein, the at least one 2/2 solenoid valve being connected, on the one hand, to the outlet port of the service-brake valve and, on the other hand, to a first connection of the valve device.

BACKGROUND INFORMATION

Such a traction-slip controlled brake system is known from the German Patent Application DE 10 2009 016 982 A1. The known brake system includes a halt brake of the type found in today's electropneumatic brake systems in commercial vehicles, such as buses or garbage trucks that frequently approach stops (stopping places or station stops). Such a halt brake, which supplements the service brake device with a halt brake function, is activated, respectively applied at the stops. A manually operable switch is provided for this purpose, upon whose actuation, a constant pressure of a predefined magnitude is introduced into the service brake cylinders of at least one axle in order to brake the motor vehicle at the stops. In contrast to a normal service braking triggered via a pedal-operated brake valve, the brake pressure is, therefore, not controllable by the driver in the case of the halt brake function.

To realize the halt brake, a pressure limiting device is connected within a pressure line that is branched off from a supply pressure line. Also connected therein is a switch-operable solenoid valve which controls the supply pressure that is limited to the constant halt pressure, through a shuttle valve which, in turn, is connected to a pneumatic channel of the service-brake valve in order to further control the greater pressure in the particular case. In addition, an ASR valve for regulating traction slip is provided in a downstream pressure line. This design is relatively complex, however.

It is, therefore, an object of the exemplary embodiments and/or exemplary methods of the present invention to further improve a traction-slip controlled brake system of the type mentioned at the outset so as to provide it with a greater range of function in the context of a simpler design.

SUMMARY OF THE INVENTION

This objective is achieved in accordance with the exemplary embodiments and/or exemplary methods of the present invention by the features described herein.

Underlying the exemplary embodiments and/or exemplary methods of the present invention is the idea that at least one 2/2 solenoid valve and the valve device are controllable by a control device in a way that allows the 2/2 solenoid valve to be switched to the open position and the valve device to be switched to the first operating position in order to implement traction-slip control; and a brake pressure to be generated at a predetermined level in the at least one brake actuator on the basis of the pressure medium from the pressure medium reserve; and the 2/2 solenoid valve to be switched to the closed position and the valve device to the first operating position.

"To implement traction-slip control" signifies the case where the drive slip exceeds a predefined drive slip limit upon acceleration of the vehicle, and the (unacceptably high) actual drive slip must, therefore, be adjusted to a setpoint drive slip.

The "brake pressure at a predetermined level" refers to the halt brake pressure, for example, for the case where the halt brake-actuating element is actuated into a position where the halt brake is applied. Moreover, the "brake pressure at a predetermined level" could also refer to the brake pressure last generated by the driver in the context of a starting assist (hill holder) function to brake the vehicle that is to be held in the brake actuators for a certain period of time, in particular until the vehicle starts off once more.

Thus, a very simple valve design, including, namely, one single 2/2 solenoid valve and the valve device, which may be constituted of one single 3/2 solenoid valve, may be used to realize a plurality of auxiliary functions for a brake system, such as traction-slip control or hill holder, as are customary in today's commercial vehicles. The result is an advantageously simple and, therefore, inexpensive brake system design. In particular, a halt brake realization no longer requires a pressure limiting device since the valve device, which is already used for traction-slip control, supplies the constant halt brake pressure from the compressed-air reserve. Thus, this valve device (for example, a 3/2 solenoid valve) advantageously performs a dual function.

Advantageous further refinements of the exemplary embodiments and/or exemplary methods of the present invention delineated herein and improvements thereto are rendered possible by the measures further set forth herein.

One exemplary embodiment provides for at least one ABS pressure control valve, which is controlled by the control device, to be interposed between the valve device and the at least one brake actuator. Such ABS pressure control valves are reasonably well known and are used for maintaining, building up and reducing pressure in the course of an anti-lock braking control. To implement traction-slip control in response to unacceptably high drive slip when a vehicle drives off, the at least one ABS pressure control valve may then be cyclically controlled in order to adjust the drive slip to a predefined drive slip on the basis of a pressure from the pressure medium reserve introduced by the valve device into the at least one ABS pressure control valve. In this case, the valve device is then used to switch a supply pressure, that is still to be modulated by the ABS pressure control valves, to the ABS pressure control valves.

As already mentioned above, the brake system may include a halt brake having a halt brake-actuating element, upon whose actuation by the driver, a predetermined halt brake pressure is applied to the brake actuators of at least one axle. The halt brake includes an electrical signal-modulating, manually actuated switching element, for example, which is actuated by the driver to effect halt braking. The at least one 2/2 solenoid valve is then switched to the closed position in response to the electrical halt brake signal from the control device. In addition, the control device cyclically switches the valve device between the first operating position and the second operating position in order to generate the predetermined halt brake pressure in the brake actuators of the at least one axle on the basis of the pressure of the pressure medium from the pressure medium reserve. The predetermined halt brake pressure may be generated in this manner in all brake actuators of the vehicle. The cyclical operation, respectively switching of the valve device is performed as a function of the predefined halt brake pressure to be achieved.

However, the "brake pressure at a predetermined level" could also be a brake pressure that is predefined by a headway distance control or adaptive cruise control (ACC) to be able to maintain a preset distance to a vehicle in front.

Last but not least, the "brake pressure at a predetermined level" could also be the brake pressure which was used to brake a vehicle in the course of a starting assist function implemented in the control device and which, without further actuation of the brake, is to be held for a certain period of time. For this starting-traction control, the 2/2 solenoid valve is switched to the closed position in order to interrupt the pressure line between the service-brake valve and the brake actuators, respectively "lock in" the pressure in the brake actuators of the at least one axle, thereby allowing the brake pressure most recently generated by the driver to be maintained.

However, since a pressure loss from pneumatic systems can never be completely ruled out, it may be additionally provided in the context of the starting assist (hill holder) function for the control device to cyclically switch the valve device configured downstream of the 2/2 solenoid valve between the first operating position and the second operating position in order to at least generate the most recently introduced brake pressure in the brake actuators of the at least one axle on the basis of the pressure of the pressure medium from the pressure medium reserve, respectively to maintain the same there also over a longer period of time. If a pressure loss is ascertained or estimated from other quantities, the valve device may then reproduce, respectively maintain the most recently generated, driver-dependent brake pressure by cyclical switching, i.e., by the one-time or repeated switching between the first operating position and the second operating position. In this context, a higher brake pressure may also be generated by the cyclical switching of the valve device than, for example, by the most recent driver actuation-dependent brake pressure that led to the braking of the vehicle. The value of the previously generated, driver-dependent brake pressure may be estimated, respectively measured using a brake-pressure sensor, for example.

For functions such as halt brake, starting-traction control or headway distance control, the control device drives the at least one above mentioned ABS pressure control valve to switch it to the open position. In other words, the ABS pressure control valve may have no influence on the brake pressure buildup in the mentioned cases and, for these purposes, may also be eliminated if the vehicle is not provided with any anti-lock braking control during braking.

All of the examples described above relate to cases where a specific pressure level is to be adjusted, respectively built up. However, within the scope of functions such as a headway distance control, cases are also conceivable where brake pressure must be reduced. For example, in the context of a headway distance control, the situation may arise where a comparatively high brake pressure, as described above, initially adjusted to set the predefined minimum distance to a vehicle suddenly cutting into the lane, is subsequently no longer needed to keep a constant distance to the vehicle ahead on a downhill stretch, for example. The previously adjusted high brake pressure must then be reduced.

To reduce pressure in the at least one brake actuator, the at least one 2/2 solenoid valve may then be cyclically controlled by the control device, and the valve device is switched to the second operating position. This enables too high brake pressure to be reduced to the desired lower level via the then through-connected valve device and the through-connected 2/2 solenoid valve by way of the service-brake valve, which typically has a pressure reduction or bleed feature.

Via the at least one 2/2 solenoid valve and the valve device having merely two operating positions, brake pressures may then be built up, maintained, as well as reduced for additional brake-system functions, such as traction slip control, halt brake, starting assist (hill holder) or adaptive cruise control (ACC), while entailing a low degree of complexity. This enumeration is not conclusive. Rather, the exemplary embodiments and/or exemplary methods of the present invention may also be conceivably used for other purposes where building up, maintaining and/or reducing pressure are important. Between the outlet port of service-brake valve and the at least one brake actuator, one further embodiment provides for a bypass connection to bridge the 2/2 solenoid valve and the valve device and within which at least one nonreturn valve is connected in a way that allows it to close toward the outlet port of the service-brake valve and to open toward the at least one brake actuator. This inventive refinement makes it possible for the brake pressure level, that had been preset by the at least one 2/2 solenoid valve and the valve device in the context of the particular function, such as the starting assist, to be increased via the parallel branch of the bypass connection. Thus, when the driver actuates the pedal of the service-brake valve, the pressure prevailing in the at least one brake actuator may be increased via this parallel bypass connection and the thereby opening nonreturn valve. However, pressure may not be reduced via the bypass connection since the nonreturn valve closes toward the service-brake valve.

To control greater volumes of air, a relay valve, which is connected to the valve device on the control side, may be interposed between the valve device and the at least one brake actuator.

The valve device may be constituted of a 3/2 solenoid valve, the first connection being connected to the 2/2 solenoid valve, a second connection to the pressure medium reserve, and a third connection indirectly or directly to the at least one brake actuator. In its open position, the 2/2 solenoid valve establishes a connection between the first connection of 3/2 solenoid valve and the outlet port of the service-brake valve; in its closed position, this connection being blocked.

In accordance with one further specific embodiment, the 2/2 solenoid valve and the valve device, respectively the 3/2 solenoid valve may be accommodated in a shared housing and be constituted of one single valve which then encompasses all switching functionalities of the 2/2 solenoid valve and of the valve device, respectively of the 3/2 solenoid valve.

A more detailed description is provided in the following with reference to an exemplary embodiment.

Exemplary embodiments of the present invention are illustrated in the drawing and are described in greater detail herein below.

DETAILED DESCRIPTION

Figure 1:
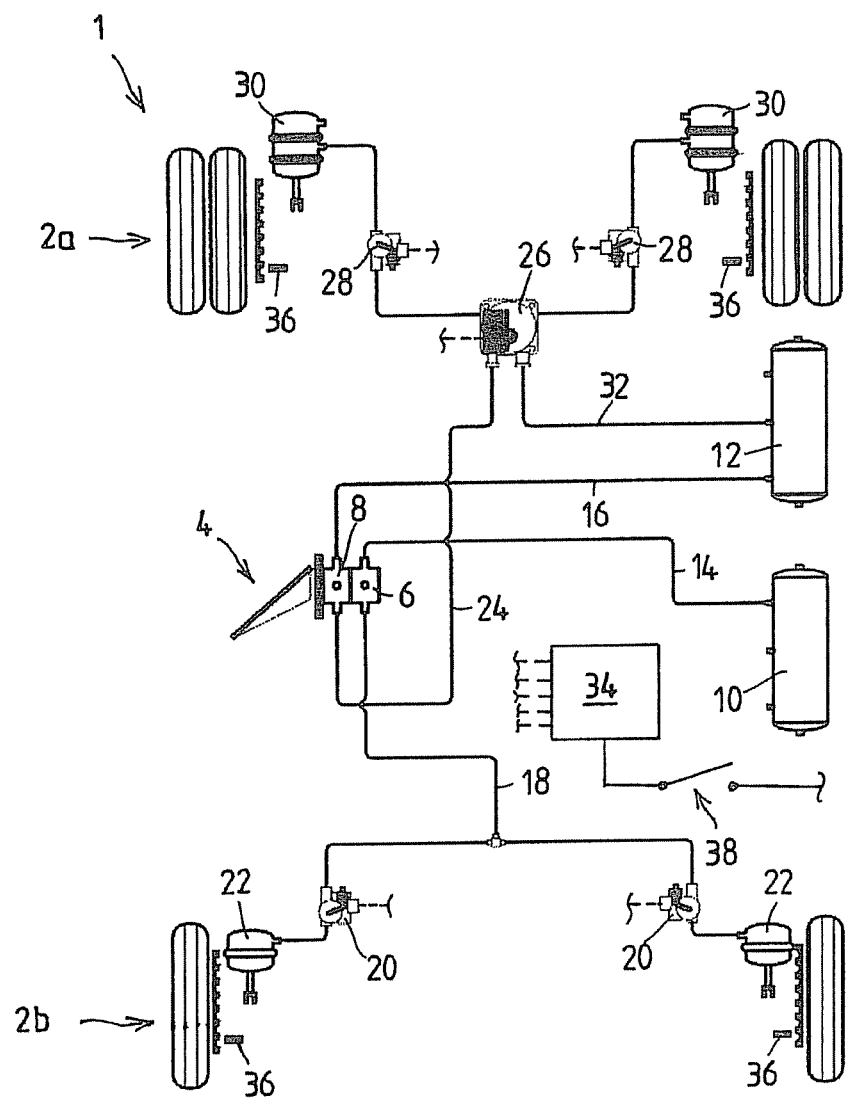
FIG. 1 shows a schematic circuit diagram of a pressure medium-actuated brake system having a valve unit in accordance with one exemplary embodiment of the present invention.

The schematic circuit diagram shown in FIG. 1 of a brake system 1 of a bus is limited to essential assemblies and elements of the present invention, respectively to components that cooperate therewith. It is assumed here that merely rear axle 2a of the bus is powered, front axle 2b being a nonpowered, but steerable and brakable front axle.

With the exception of auxiliary functions, such as a halt brake and traction-slip control (ASR), brake system 1 of the exemplary embodiment is controlled and actuated purely pneumatically and also has ABS functionalities. Alternatively, brake system 1 may also be an electropneumatic braking device or also an electronically controlled brake system (EBS).

Accordingly, brake system 1 has a two-channel service-brake valve 4, for example, that is actuatable by a pedal 3 in response to the action of the driver's foot; a front-axle channel 6 of service-brake valve 4 being assigned to a front-axle service-brake circuit, and a rear-axle channel 8 being assigned to a rear-axle service-brake circuit. For this, an inlet of front-axle channel 6 of service-brake valve 4 is connected to a front-axle compressed-air reserve 10, and an inlet of rear-axle channel 8 is connected to a rear-axle compressed-air reserve 12 via a supply line 14, 16, respectively.

On the other hand, an outlet of front-axle channel 6 of service-brake valve 4 is connected via a pressure line 18 and ABS pressure control valves 20 to brake actuators 22 of front axle 2b, and an outlet of rear-axle channel 8 of service-brake valve 4 is connected via a pressure line 24, a valve unit 26, as well as downstream ABS pressure control valves 28 of each wheel, to brake actuators 30 of the rear axle. Valve unit 26 is connected via an additional supply line 32 to rear-axle compressed-air reserve 12, for example. Valve unit 26 is connected within pressure line 24 of rear-axle service-brake circuit.

Brake actuators 22, 30 of front axle 2b and of the rear axle are pneumatic, active service brake cylinders; at rear axle 2a, they are combination cylinders which include passive spring-type cylinders. A traction slip control (ASR) is provided for powered rear axle 2a of the bus and is used to adjust an actual drive slip in a manner known per se to a setpoint drive slip. In addition, an ABS, which is controlled for each wheel, is provided for front axle 2b, as well as for rear axle 2a.

ABS pressure control valves 20, 28, which are designed as solenoid valves and are reasonably well known, and electromagnetic valve unit 26 may be controlled by an electronic control device 34. In addition, wheel-speed sensors 36 are provided for each wheel in order to transmit wheel speed information to control device 34 at least in the context of ABS and ASR. The halt brake includes an electrical switch 38, for example, which may transmit a halt brake signal to electronic control device 34 in order to apply or release the halt brake.

Therefore, rear-axle service-brake valve encompasses rear-axle compressed-air reserve 12, rear-axle channel 8 of service brake valve 4, valve unit 26, ABS pressure control valves 28 of the wheels of rear axle 2a and brake actuators 30. Together with the components of front-axle service-brake circuit, such as front-axle compressed-air reserve 10, front-axle channel 6 of service brake valve 4, ABS pressure control valves 20 of the wheels of front axle 2b, the components of rear-axle service-brake circuit, together with control device 34, make up a service brake device of a service brake of the bus that is used for braking the vehicle that is underway.

The halt brake circuit, respectively the halt brake which here, for example, cooperates with the rear-axle service-brake circuit, respectively overlaps with the same, includes switch 38 as halt brake-actuating element, and control device 34, as well as valve unit 26.

In the case that brake device 1 is an electronically controlled brake system (EBS) having an electronic EBS control unit, electronic control device 34 may also be integrated in the EBS control unit. Electronic control device 34 is connected via control, respectively signal lines (drawn as dashed lines in FIG. 1) to wheel speed sensors 36, ABS pressure control valves 20, 28, as well as to valve unit 26.

Figure 2:
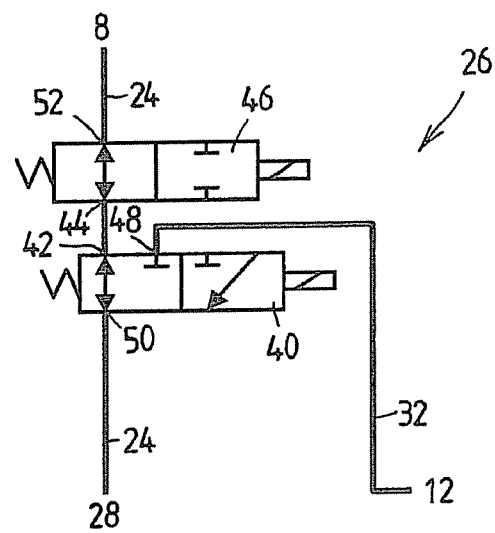
FIG. 2 shows a schematic circuit diagram of the valve unit of FIG. 1 in accordance with one exemplary embodiment, including a 2/2 solenoid valve that cooperates with a 3/2 solenoid valve.

The exemplary embodiment of valve unit 26 shown in FIG. 2 includes a 3/2 solenoid valve 40, for example, whose first connection 42 is connected to a connection 44 of a 2/2 solenoid valve 46; whose second connection 48 is connected via supply line 32 to rear-axle pressure medium reserve 12, and whose third connection 50 is connected via ABS pressure control valves 28 of rear axle 2a to brake actuators 30 of rear axle 2a. Further connection 52 of 2/2 solenoid valve 46 is directly connected to pressure line 24 of rear-axle channel 8 of service brake valve 4, for example.

In its de-energized and spring-loaded open position shown exemplarily in FIG. 2, 2/2 solenoid valve 46 forms a connection between first connection 42 of 3/2 solenoid valve 40 and rear-axle channel 8 of service-brake valve 4; in its exemplarily energized closed position, this connection being blocked. In addition, in accordance with a first operating position, 3/2 solenoid valve 40 connects rear-axle pressure medium reserve 12 and, in accordance with a second operating position shown in FIG. 2, connects connection 44 of 2/2 solenoid valve 46 to ABS pressure control valves 28 of rear axle 2a, and thus directly to brake actuators 30 of the rear axle.

Valve 26 may form one unit having a shared housing for 2/2 solenoid valve 46, 3/2 solenoid valve 40, and for further components referred to in the specific embodiments described in the following, and is provided with corresponding connections.

In this context, the operating principle of brake system 1 is explained in the following: Service-brake valve 4 is actuated by the driver for service braking operations; appropriate brake pressures being generated in front-axle channel 6, respectively in rear-axle channel 8, and being introduced into ABS pressure control valves 20, 28. These allow the brake pressures to flow through if no unacceptable brake slips are occurring at the wheels. Otherwise, i.e., in the event that unacceptable brake slips are occurring, the brake pressure is reduced, maintained or built up by ABS pressure control valves 20, 28.

Figure 3:
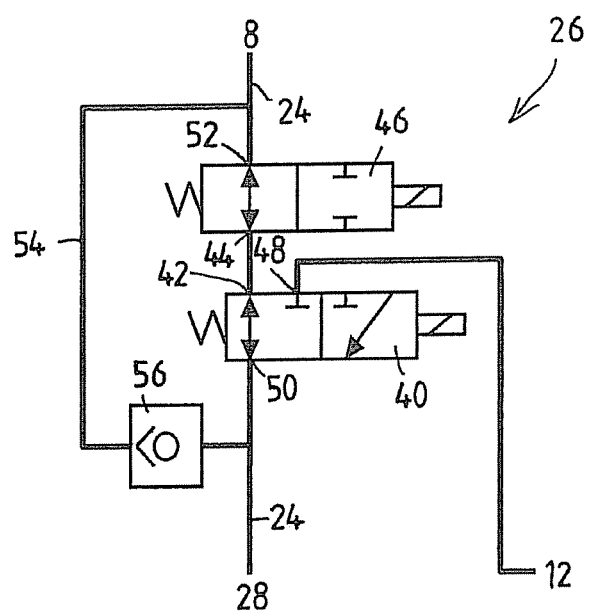
FIG. 3 shows a schematic circuit diagram of the valve unit of FIG. 1 in accordance with one further specific embodiment, including a 2/2 solenoid valve that cooperates with a 3/2 solenoid valve, and also including a bypass having a nonreturn valve.

To implement traction-slip control when accelerating, i.e., when the drive slip exceeds a setpoint drive slip, 2/2 solenoid valve 46 is switched to the open position shown in FIG. 2, and 3/2 solenoid valve 40 is switched to the first operating position in which rear-axle compressed-air reserve 12 is connected to ABS pressure control valves 28 of rear axle 2a. On the basis of the introduced supply pressure, ABS pressure control valves 28 then regulate the brake pressure in brake actuators 30 of rear axle 2a for each wheel as a function of the system deviation. However, to regulate brake pressure by axle in the context of ASR, 2/2 solenoid valve 46 could also be driven by control device 34 to compensate for the system deviation, for example, by switching cyclically, back and forth between the open and closed position.

When, in the context of the halt brake, a predetermined halt brake pressure is to be applied to brake actuators 30 of rear axle 2a by actuation of switch 38, control device 34 then responds to the corresponding electric halt brake signal and induces 2/2 solenoid valve 46 to switch to the closed position. In addition, 3/2 solenoid valve 40 is cyclically switched by control device 34 between the first operating position and the second operating position in order to generate the predetermined halt brake pressure for brake actuators 30 of rear axle 2a on the basis of the pressure of the pressure medium from rear-axle pressure medium reserve 12. The cyclical operation, respectively switching of 3/2 solenoid valve 40 is carried out as a function of the predefined halt brake pressure to be achieved.

However, a valve unit 26 of the type described could be additionally provided at front axle 2b. Such a valve unit 34 would then be supplied with compressed air from front-axle compressed-air reserve 10, for example, and would be connected within pressure line 18. The brake pressure at a predetermined level adjusted by valve units 34 at front axle 2b and at rear axle 2a could then be a brake pressure that is predefined by a headway distance control or adaptive cruise control (ACC) to be able to maintain a preset distance to a vehicle in front.

Last but not least, the "brake pressure at a predetermined level" could also be the brake pressure that was used to brake a vehicle in the course of a starting assist function implemented in control device 34 and that is to be maintained for a certain period of time, without further actuation of the brake. To implement starting-traction control, 2/2 solenoid valve 46 is switched to the closed position in order to interrupt pressure line 24, respectively 18 between service-brake valve 4 and brake actuators 22, 30, respectively "lock in" the pressure in brake actuators 22, 30 of at least one axle 2a, 2b, thereby allowing the brake pressure most recently generated by the driver to be maintained.

To compensate for potential pressure losses, it may be additionally provided in the context of the starting assist (hill holder) function for control device 34 to cyclically switch 3/2 solenoid valve 40 configured downstream of 2/2 solenoid valve 46 between the first operating position and the second operating position in order to at least generate the most recently introduced brake pressure in brake actuators 22, 30 on the basis of the pressure of the pressure medium from rear-axle pressure medium reserve 12, respectively front-axle pressure medium reserve 10, respectively to maintain the same there also over a longer period of time. The value of the previously generated, driver-dependent brake pressure may be estimated, respectively measured using a brake-pressure sensor, for example.

For functions such as halt brake, starting-traction control or headway distance control, ABS pressure control valves 20, 28 are driven by control device 34 to be switched to the open position, so that ABS pressure control valves 20, 28 may have no influence on the brake pressure buildup in the mentioned cases. However, it is also conceivable to enable ABS pressure control valves 20, 28 to participate in the build-up of predefined brake pressures by the cyclical operation thereof.

For example, in the context of a headway distance control, the situation may arise where it is necessary to reduce a comparatively high, previously adjusted brake pressure. To reduce pressure in brake actuators 22, 30, 2/2 solenoid valve 46 may then be cyclically controlled by control device 34, and 3/2 solenoid valve 40 is switched to the second operating position.

In this manner, too high brake pressure may then be reduced to the desired lower level via then through-connected 3/2 solenoid valve 46 and temporarily through-connected 2/2 solenoid valve 46 by way of service-brake valve 4 since service-brake valve 4 has a pressure reduction or bleed feature.

Figure 4:
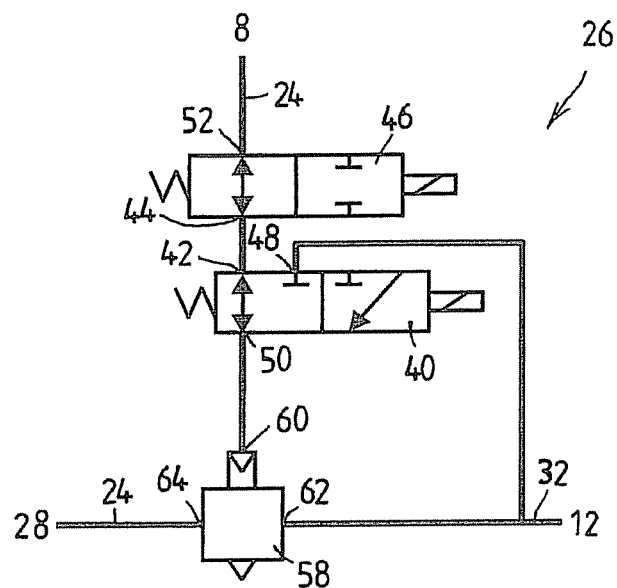
FIG. 4 shows a schematic circuit diagram of the valve unit of FIG. 1 in accordance with one further specific embodiment, including a 2/2 solenoid valve that cooperates with a 3/2 solenoid valve, and also including a relay valve.
Figure 5:
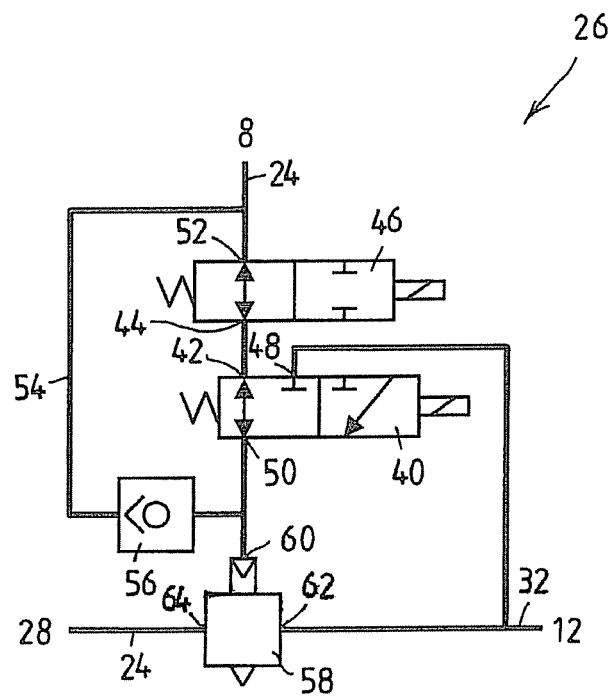
FIG. 5 shows a schematic circuit diagram of the valve unit of FIG. 1 in accordance with one further specific embodiment, including a 2/2 solenoid valve that cooperates with a 3/2 solenoid valve, a bypass having a nonreturn valve, and also including a relay valve.

In the specific embodiments of FIG. 3 through 5, identical, respectively identically functioning components and assemblies are denoted by the same reference numerals as in FIG. 2.

A bypass connection 54, which bridges 2/2 solenoid valve 46 and 3/2 solenoid valve 40 in pressure line 24 and which may be likewise integrated in valve unit 26, respectively the unit, is provided in the specific embodiment of FIG. 3 between rear-axle channel 8 of service-brake valve 4 and ABS pressure control valves 28, respectively brake actuators 30 of the rear axle. Therefore, bypass connection 54 branches off from pressure line 24 upstream of 2/2 solenoid valve 46 and leads again into pressure line 24 downstream of 3/2 solenoid valve 40, viewed from service-brake valve 4.

At least one nonreturn valve 56 is connected within this bypass connection 54 in a way that allows it to close toward rear-axle channel 8 of service-brake valve 4 and open toward ABS pressure control valves 28, respectively brake actuators 30. This makes it possible to increase the predefined, respectively desired brake pressure level preset by 2/2 solenoid valve 46 and 3/2 solenoid valve 40, for example in the context of the starting assist, via the parallel branch of bypass connection 54. Thus, when the driver actuates the pedal of service-brake valve 4, the pressure prevailing in brake actuators 30 may be increased via this parallel bypass connection 54 and the thereby opening nonreturn valve 56. On the other hand, pressure may not be reduced via bypass connection 54 since nonreturn valve 56 closes toward service-brake valve 4. Apart from that, the operating principle of valve unit 26 is comparable to that described in the context of FIG. 2.

In the specific embodiment of FIG. 4, a relay valve 58 is interposed between 3/2 solenoid valve 40 and ABS pressure control valves 28, respectively brake actuators 30 in order to control greater volumes of air. In this context, a control connection 60 of relay valve 58 is connected to third connection 50 of 3/2 solenoid valve 40, a supply connection 62 to rear-axle compressed-air reserve 12, for example, and a working connection 64 to ABS pressure control valves 28, respectively directly to brake actuators 30. Last but not least, relay valve 58 also has a bleed feature. As a function of the pressure prevailing at control connection 60 thereof, relay valve 58 modulates an appropriate brake pressure from the pressure of rear-axle compressed-air reserve 12. Apart from that, the operating principle of valve unit 26 is comparable to that described in the context of FIG. 2.

In the specific embodiment of FIG. 5, both a bypass connection 54 having a nonreturn valve 56, as well as a relay valve 58 are provided, so that, in terms of the operating principle, reference is made to the above explanations for FIGS. 3 and 4. It is evident here that the functions described therein are provided in combinations thereof.

In accordance with one further specific embodiment, the two valves, namely 2/2 solenoid valve 46 and 3/2 solenoid valve 40 of FIG. 2, which are installed in valve unit 26 and configured in a shared housing, may be designed as one single valve which encompasses all switching functionalities of 2/2 solenoid valve 46 and of 3/2 solenoid valve 40. Such a single valve then has a connection to compressed-air reserve 12, a connection for rear-axle channel 8 of service-brake valve 4, as well as a connection for an ABS pressure control valve 28.

Figure 6:
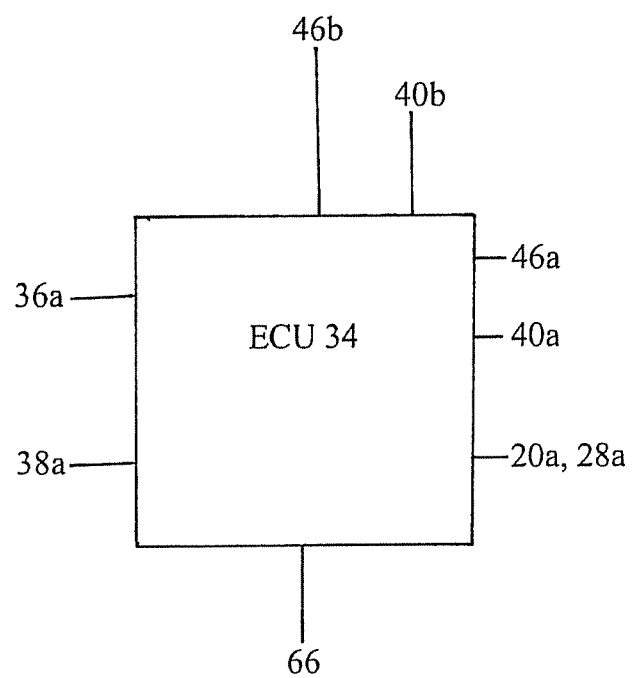
FIG. 6 shows a schematic diagram of a control device of the brake system from FIG. 1.

Control device 34 is shown in detail in FIG. 6. It features the following electrical connections:
- connections 36a for wheel speed sensors 36;
- a connection 38a for the "halt brake" switch;
- a connection 46a for 2/2 solenoid valve 46 of valve unit 26 assigned to rear axle 2a;
- a connection 40a for 3/2 solenoid valve 40 of valve unit 26 assigned to rear axle 2a;
- connections 20a, 28a for ABS pressure control valves 20, 28 of rear axle 2a and of front axle 2b; and
- in the case, as already indicated above, a valve unit 26 (as in FIG. 2) is likewise assigned to front axle 2b, a connection 46b for 2/2 solenoid valve 46 of valve unit 26 assigned to rear axle 2b, as well as a connection 40b for 3/2 solenoid valve 40 of valve unit 26 assigned to front axle 2b;
- as well as a connection 66 for external signals, for example, via a data-bus connection of the vehicle.

Against this background, control device 34 executes the following functions:
- Via connections 36a, it receives the wheel-speed values from wheel-speed sensors 36 and determines whether the brake slip or drive slip exceeds or falls below permissible values.
- Via connection 38a, it receives electric signals from the "halt brake" sensor.
- Via connection 66, it receives a delay signal for an automatic brake application for the vehicle, for example, from an adaptive cruise control (ACC), an ESP system or a starting assist function (hill holder).
- It features a memory for predefined limit values of brake pressures for each brake function or brake type. In particular, different limit values for brake pressures may be stored for rear axle 2a and front axle 2b in the case that an additional ASR valve is provided for front axle 2b (in the case of ABS, different limit values for brake pressures at each individual wheel may be stored. Last but not least, a brake pressure value for the halt brake pressure in the case of "halt brake, a brake pressure value for the starting-assist brake pressure (hill holder brake pressure), as well as a brake pressure value for an automatically triggered braking procedure may be stored).
- It controls 2/2 solenoid valve 44 via connection 44a.
- It controls 3/2 solenoid valve 40 via connection 40a.
- It controls ABS pressure control valves 20, 28 as a function of the particular brake slip via connections 20a, 28a.

Figure 7:
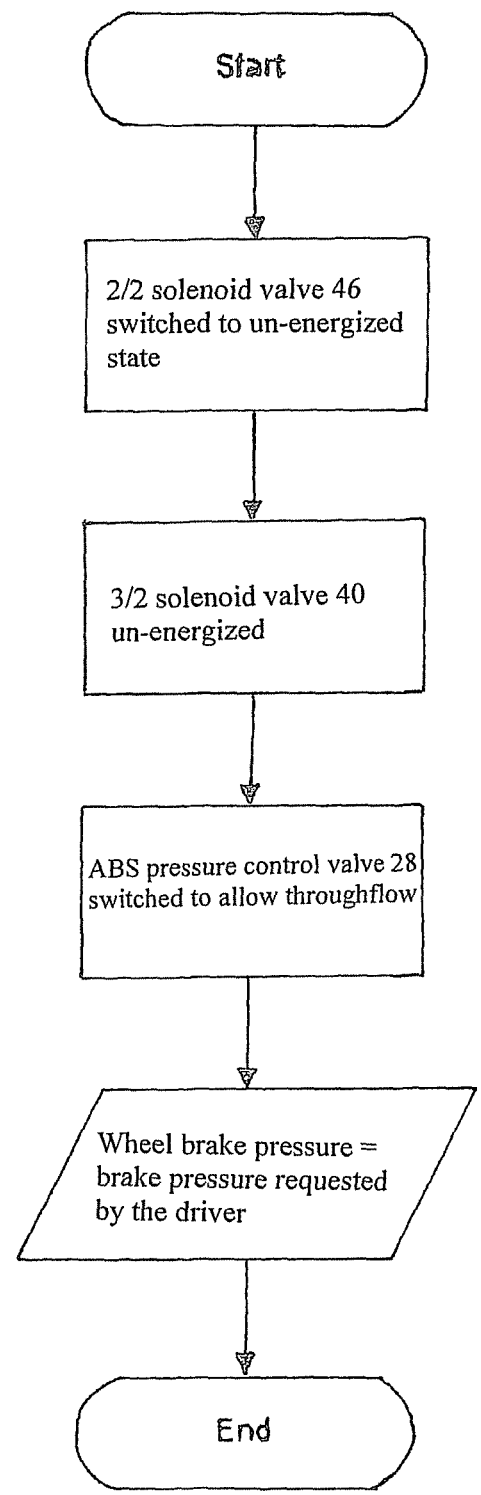
FIG. 7 shows a flow chart which represents a service braking.
Figure 8:
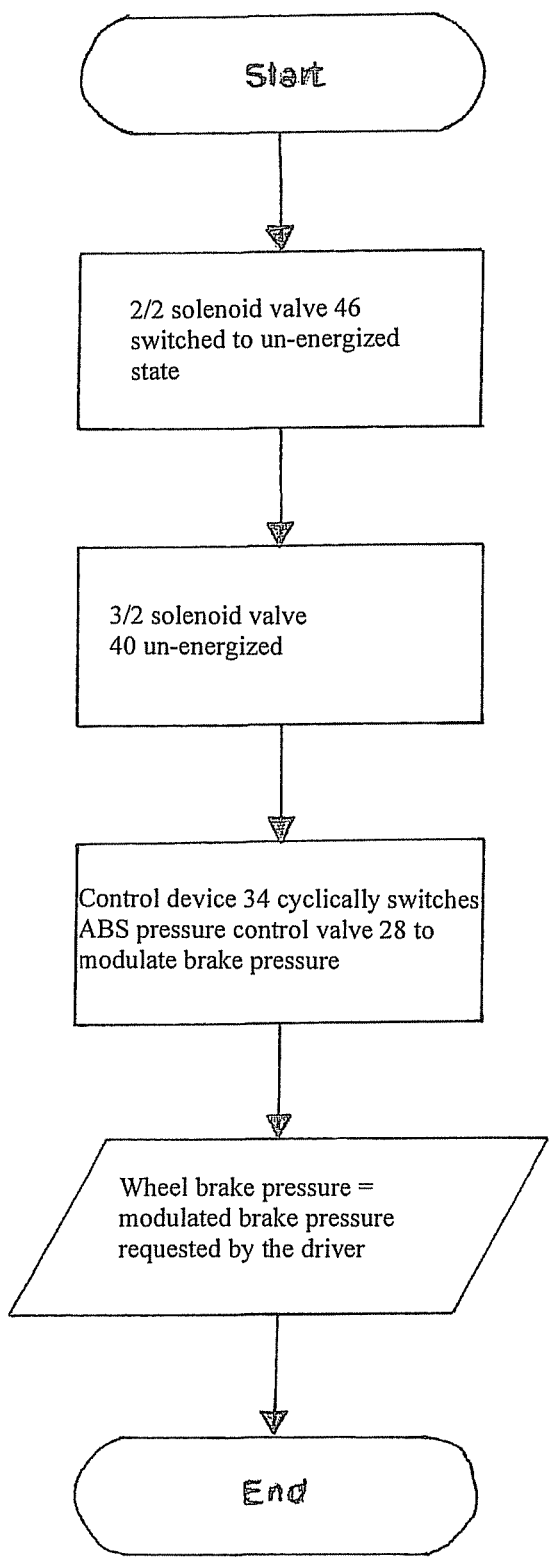
FIG. 8 shows a flow chart which represents a service braking including ABS activity.
Figure 9:
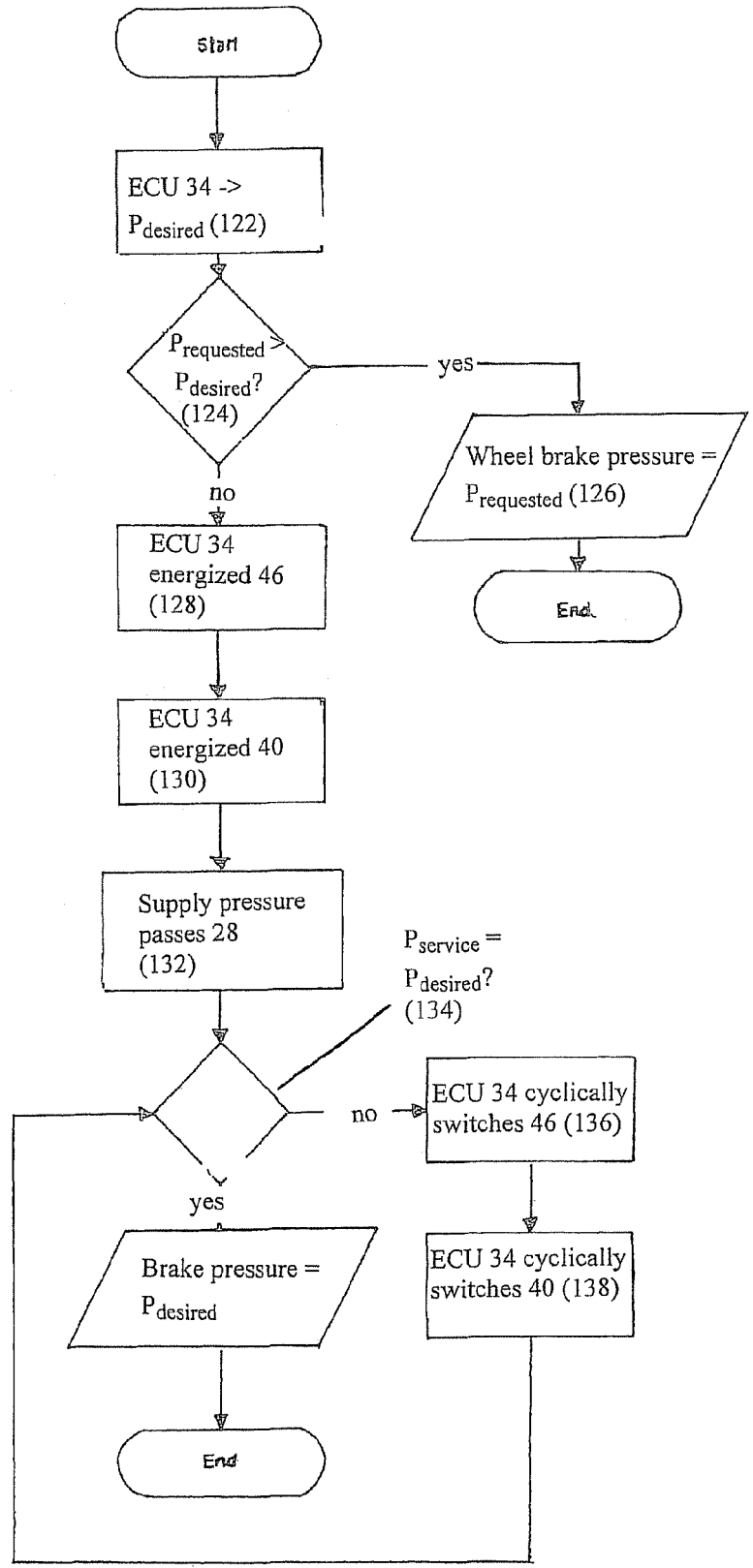
FIG. 9 shows a flow chart which represents an automatically triggered braking.

FIG. 7 through 9 illustrate flow charts for various brake modes that are implemented by the control routines of the control device. Thus, FIG. 7 shows a flow chart for a normal service braking for which valve unit 26, i.e., 2/2 solenoid valve 46, as well as 3/2 solenoid valve 40 are switched to the un-energized state upon program start, and are in the operating positions shown in FIG. 2 in which they allow the brake pressure that had been fed from rear-axle channel 8 of service brake valve 4, through to ABS pressure control valve 28 which likewise allows this pressure, unchanged, through to the corresponding wheel brake.

FIG. 8 shows a flow chart which illustrates a service braking including ABS activity. Upon program start, valve unit 26, i.e., 2/2 solenoid valve 46, as well as 3/2 solenoid valve 40 are switched again to the un-energized state, so that they are in the operating positions shown in FIG. 2. However, control device 34 cyclically controls ABS pressure control valve 28, for example, in order to modulate the brake pressure generated by the driver in rear-axle channel 8 in accordance with an optimal brake slip and to then introduce this modulated brake pressure into the corresponding wheel brake(s).

Finally, FIG. 9 shows a flow chart where the brake pressure is not generated by the driver, but rather automatically, for example, by a starting assist function (hill holder), an ESP function, an ACC function or a halt brake.

Once the program starts, control device 34 calculates desired brake pressure $P_{desired}$ from a request for the particular automatic brake function in accordance with step 122. If the driver actuates the service brake in parallel to the particular automatic brake function, a query is made in step 124 to determine whether brake pressure $P_{desired}$ is greater than brake pressure $P_{requested}$ requested by the driver. If this is the case ("yes"), then the wheel brake pressure(s) is/are determined in accordance with the brake pressure $P_{requested}$ requested by the driver in accordance with step 126. However, if this is not the case ("no"), then, in step 128, control device 34 energizes 2/2 solenoid valve 46 of valve unit 26 switching it to its closed position. At the same time, 3/2 solenoid valve 40 of valve unit 26 is energized to enable it to switch the supply pressure in rear-axle compressed-air reserve 12 to ABS pressure control valve 28 in accordance with step 130. In response thereto, compressed air then flows under supply pressure to ABS pressure control valve 28 in accordance with step 132. A current actual service brake pressure $P_{service}$ service is derived herefrom.

In step 134, it is queried whether current actual service brake pressure $P_{service}$ is equal to desired brake pressure $P_{desired}$. If the response is "yes," then, in accordance with step 140, ABS pressure control valve 28 remains in its position allowing throughflow, so that the current actual service brake pressure $P_{service}$ conveyed from rear-axle compressed-air reserve 12 is allowed through to the wheel brakes. If the response is "no," then 2/2 solenoid valve 46 of valve unit 26 is cyclically switched by control device 34 in such a way that a service brake pressure $P_{service}$ that is too high, for example, is reduced to the desired lower level via then through-connected 3/2 solenoid valve 40 and temporarily through-connected 2/2 solenoid valve 46 via service brake valve 4 in accordance with step 136, since service-brake valve 4 has a pressure reduction, respectively bleed feature. Otherwise, thus when a service brake pressure $P_{service}$ that is too low, for example, is to be increased, 3/2 solenoid valve 40 of valve unit 26 is then cyclically switched by control device 34 to allow compressed air under supply pressure to be supplied temporarily from rear-axle compressed-air reserve 12 in accordance with step 138.

The list of Reference Numerals is as follows:
1 brake system
2a rear axle
2b front axle
4 service-brake valve
6 front-axle channel
8 rear-axle channel
10 front-axle compressed-air reserve
12 rear-axle compressed-air reserve
14 supply line
16 supply line
18 pressure line
20 ABS pressure control valves
20a connection
22 brake actuator
24 pressure line
26 valve unit
28 ABS pressure control valves
28a connection
30 brake actuator
32 supply line
34 control device
36 wheel-speed sensors
36a connection
38 switch
38a connection
40 3/2 solenoid valve
40a connection
40b connection
42 first connection
44 connection
46 2/2 solenoid valve
46a connection
48 second connection
50 third connection
52 connection
54 bypass connection
56 nonreturn valve
58 relay valve
60 control connection
62 supply connection
64 working connection
66 connection

What is claimed is:

1. A traction-slip controlled brake system of a vehicle, comprising:
   a service-brake valve which generates an actuation-dependent pressure at at least one outlet port of an axle channel in response to an actuation of a valve device,
   the valve device, which, in accordance with a first operating position, establishes a direct connection or an indirect connection from a pressure medium reserve to at least one brake actuator and, in accordance with a second operating position, from at least one 2/2 solenoid valve of the valve device to the at least one brake actuator; and
   the at least one 2/2 solenoid valve, wherein the at least one 2/2 solenoid valve is connected to the outlet port of the service-brake valve and to a first connection of the valve device,
   wherein the at least one 2/2 solenoid valve and the valve device are controllable by a control device so as to allow the 2/2 solenoid valve to be switched to the open position and the valve device to be switched to the first operating position in order to implement traction-slip control by generating a brake pressure at a predetermined level based on the pressure medium from the pressure medium reserve in the at least one brake actuator, and
   wherein the 2/2 solenoid valve is switched to the closed position and the valve device is switched to the first operating position in order to block an actuation-dependent pressure generated by the service-brake valve from the at least one brake actuator.

2. The brake system of claim 1, wherein at least one ABS pressure control valve, which is controlled by the control device, is interposed between the valve device and the at least one brake actuator.

3. The brake system of claim 2, wherein, to implement traction-slip control, the at least one ABS pressure control valve is cyclically controlled to adjust the drive slip to a predefined drive slip based on a pressure from the pressure medium reserve introduced by the valve device into the at least one ABS pressure control valve.

4. The brake system of claim 2, wherein, to implement halt braking or starting-traction control, the control device drives the at least one ABS pressure control valve to switch it to the open position.

5. The brake system of claim 1, wherein a starting assist function is implemented in the control device, in the case of which a brake pressure generated by the driver for braking the vehicle is maintained for a certain period of time without further actuation of the service braking valve, and wherein to implement starting-traction control, the 2/2 solenoid valve is switched to the closed position.

6. The brake system of claim 5, wherein the valve device is cyclically switched between the first operating position and the second operating position to maintain the brake pressure most recently generated by the driver in at least one brake actuator for a certain period of time based on the pressure of the pressure medium from the pressure medium reserve.

7. The brake system of claim 1, further comprising:
   a halt brake having a halt brake-actuating element, upon whose actuation by the driver, a predetermined halt brake pressure is applied to the brake actuators of at least one axle;
   wherein to implement halt braking, the at least one 2/2 solenoid valve is switched to the closed position, and the valve device is cyclically switched by the control device between the first operating position and the second operating position to generate the predetermined halt brake pressure in the brake actuators of the at least one axle based on the pressure of the pressure medium from the pressure medium reserve.

8. The brake system of claim 1, wherein the service-brake valve has a bleed feature, and to reduce pressure in the at least one brake actuator through the bleed feature, the at least one 2/2 solenoid valve is cyclically controlled by the control device, and the valve device is switchable to the second operating position.

9. The brake system of claim 1, wherein, provided between the outlet port of the service-brake valve and the at least one brake actuator is a bypass connection which bridges the 2/2 solenoid valve and the valve device and within which at least one nonreturn valve is connected in a way that allows it to close toward the outlet port of the service brake valve and open toward the at least one brake actuator.

10. The brake system of claim 1, wherein a relay valve, which is connected to the valve device on the control side, is interposed between the valve device and the at least one brake actuator.

11. The brake system of claim 1, wherein, in accordance with the open position, the 2/2 solenoid valve establishes a connection between the first connection of a 3/2 solenoid valve and the outlet port of the service-brake valve and, in the closed position, blocks this connection.

12. The brake system of claim 1, wherein the 2/2 solenoid valve and the valve device are accommodated in a shared housing and are constituted of one single valve.

* * * * *